United States Patent [19]
Kobayashi et al.

[11] Patent Number: 5,908,951
[45] Date of Patent: Jun. 1, 1999

[54] HYDROSILYLATION CATALYST AND HYDROSILYLATION METHOD

[75] Inventors: Kazuo Kobayashi; Yoshitsugu Morita, both of Chiba Prefecture, Japan

[73] Assignee: Dow Corning Toray Silicone Co., Ltd., Tokyo, Japan

[21] Appl. No.: 09/152,116

[22] Filed: Sep. 14, 1998

[30] Foreign Application Priority Data

Sep. 30, 1997 [JP] Japan .................... 9-282691

[51] Int. Cl.$^6$ .............. C07F 07/08; B01J 31/02
[52] U.S. Cl. .......... 556/479; 502/158; 502/152; 502/156
[58] Field of Search .............. 556/479; 502/152, 502/156, 158

[56] References Cited

U.S. PATENT DOCUMENTS

| | | | |
|---|---|---|---|
| 4,248,751 | 2/1981 | Willing | 260/29.2 |
| 4,761,454 | 8/1988 | Oba et al. | 524/862 |
| 4,791,029 | 12/1988 | Fau et al. | 428/447 |
| 5,328,974 | 7/1994 | McAfee et al. | 556/479 X |
| 5,563,287 | 10/1996 | Roy | 556/479 |
| 5,567,848 | 10/1996 | Roy | 556/479 |
| 5,792,723 | 8/1998 | Ikeno et al. | 502/158 |

*Primary Examiner*—Paul F. Shaver
*Attorney, Agent, or Firm*—James L. De Cesare

[57] ABSTRACT

A catalyst enables hydrosilylation of aliphatically unsaturated carbon-carbon bonds by silicon-bonded hydrogen to be conducted rapidly in water. The catalyst provides a rapid method of carrying out hydrosilylation in water. An emulsion form of catalyst includes a dispersion in water of liquid catalyst, the main component of which is a platinum and alkenylsiloxane complex. The volumetric average particle size of liquid catalyst dispersed is less than or equal to 1 $\mu$m. Hydrosilylation of an aliphatically unsaturated carbon-carbon bond by silicon-bonded hydrogen is carried out in water using the catalyst.

8 Claims, No Drawings

HYDROSILYLATION CATALYST AND HYDROSILYLATION METHOD

FIELD OF THE INVENTION

This invention relates to hydrosilylation catalysts and methods of hydrosilylation. More particularly, the invention relates to a catalyst that promotes rapid hydrosilylation of aliphatically unsaturated carbon-carbon bonds by SiH in water, and to a method of using the catalyst to effect a rapid hydrosilylation in water.

BACKGROUND OF THE INVENTION

Hydrosilylation is a reaction in which silicon-bonded hydrogen adds across an aliphatically unsaturated carbon-carbon bond under catalysis by a hydrosilylation catalyst such as chloroplatinic acid, platinum-alkenylsiloxane complexes, and platinum-olefin complexes.

Carbon-silicon bonds can be easily generated by this reaction, and as a consequence, it has found use in reactions for the synthesis of a variety of organosilanes, silicon-containing organic compounds, and organopolysiloxanes. It is also employed as a crosslinking reaction for curable organopolysiloxane compositions.

However, as shown in Japanese Patent Publication Kokoku Number Sho 58-17226 (17,226/1983)U.S. Pat. No. 4,248,751; Japanese Patent Application Laid Open Kokai/Unexamined Numbers Sho 62-257939 (257,939/1987)/U.S. Pat. No. 4,761,454; and Sho 63-6053 (6,053/1988)/U.S. Pat. No. 4,791,029; execution of hydrosilylation reactions in water has been associated with an inhibition of activity of the hydrosilylation catalyst by water, and hence a failure of hydrosilylation to proceed rapidly and the necessity for long periods of time for the reaction to reach completion.

Addition of large amounts of hydrosilylation catalyst to accelerate the reaction under these conditions leads to problems such as only a localized development of hydrosilylation, and discoloration due to the large amounts of catalyst employed.

BRIEF SUMMARY OF THE INVENTION

Therefore, an object of the invention is to provide a catalyst that enables hydrosilylation of aliphatically unsaturated carbon-carbon bonds by silicon-bonded hydrogen to proceed rapidly in water. Another object is to provide a rapid method for carrying out hydrosilylation in water.

These and other features of the invention will become apparent from a consideration of the detailed description.

DETAILED DESCRIPTION OF THE INVENTION

One type of hydrosilylation catalyst according to the present invention is an emulsion comprising a dispersion in water of "a liquid catalyst whose main component is a platinum-alkenylsiloxane complex", hereafter referred to as "PAC-based liquid catalyst". This catalyst is characterized in that it is dispersed in liquid particle form in water, and has a volumetric average particle size less than or equal to 1 $\mu$m/1 micrometer.

Another type of hydrosilylation catalyst according to the present invention comprises a surfactant and a PAC-based liquid catalyst. Upon dispersion of the surfactant and the PAC-based liquid catalyst in water, an emulsion is formed in which the PAC-based liquid catalyst is dispersed in liquid particle form in water with a volumetric average particle size less than or equal to 1 $\mu$m.

The hydrosilylation method according to the present invention is characterized by hydrosilylation of an aliphatically unsaturated carbon-carbon bond by silicon-bonded hydrogen in water using these hydrosilylation catalysts.

The emulsion-type hydrosilylation catalyst is a dispersion in water of a liquid catalyst whose main component is a platinum-alkenylsiloxane complex. The platinum-alkenylsiloxane complex is exemplified by platinum-1,3-divinyl-1,1,3,3-tetramethyldisiloxane complex, platinum-1,3-diallyl-1,1,3,3-tetramethyldisiloxane complex, platinum-1,3-divinyl-1,3-dimethyl-1,3-diphenyldisiloxane complex, platinum-1,3-divinyl-1,1,3,3-tetraphenyldisiloxane complex, and platinum-1,3,5,7-tetramethyl-1,3,5,7-tetravinylcyclotetrasiloxane complex.

To improve the stability of these platinum-alkenylsiloxane complexes in the liquid catalyst, additives such as ligands and liquid organosiloxane oligomers can be added to the liquid catalyst.

An example of some suitable ligands are 1,3-divinyl-1,1,3,3-tetramethyldisiloxane, 1,3-diallyl-1,1,3,3-tetramethyldisiloxane, 1,3-divinyl-1,3-dimethyl-1,3-diphenyldisiloxane, 1,3-divinyl-1,1,3,3-tetraphenyldisiloxane, and 1,3,5,7-tetramethyl-1,3,5,7-tetravinylcyclotetrasiloxane.

Liquid organosiloxane oligomers are exemplified by dimethylsiloxane oligomers.

To disperse the liquid catalyst as liquid microparticles in water, lower alcohols containing no more than 4 carbons, or a water-soluble organic solvent such as a ketone can be added to the liquid catalyst. Some examples of suitable additives include methanol, ethanol, n-propanol, isopropanol, tert-butanol, acetone, and methyl ethyl ketone.

One especially preferred liquid catalyst is a 1,3-divinyl-1,1,3,3-tetramethyldisiloxane solution of a platinum 1,3-divinyl-1,1,3,3-tetramethyldisiloxane complex.

This catalyst can be an emulsified form of the hydrosilylation catalyst in which the above-described PAC-based liquid catalyst is dispersed in water using a surfactant. The volumetric average particle size of the catalyst dispersed in liquid particulate form, i.e., the average particle size in the volumetric particle size distribution, must however be no greater than 1 $\mu$m.

The average particle size is preferably no greater than 0.8 $\mu$m, and most preferably no greater than 0.5 $\mu$m. In addition, catalyst particles with sizes no greater than 1 $\mu$m preferably make up at least 40 weight percent of the volumetric particle size distribution of the catalyst dispersed in liquid particulate form in water.

The hydrosilylation catalyst can be prepared by dispersing the PAC-based liquid catalyst in water with a surfactant using a stirrer or mixer such as a colloid mill or homogenizer. The use of a strongly dispersing surfactant improves the stability of the PAC-based liquid catalyst in water.

Another method of preparing the hydrosilylation catalyst is to preliminarily disperse the PAC-based liquid catalyst in a surfactant without water, and then to disperse this dispersion in water. The surfactants used in either method can be anionic, cationic, or nonionic surfactants.

Some suitable anionic surfactants are hexylbenzenesulfonic acid, octylbenzenesulfonic acid, decylbenzenesulfonic acid, dodecylbenzenesulfonic acid, cetylbenzenesulfonic acid, myristylbenzenesulfonic acid, and their corresponding sodium salts.

Some suitable cationic surfactants are octyltrimethylammonium hydroxide, dodecyltrimethylammonium hydroxide, hexadecyltrimethylammonium hydroxide, octyldimethylbenzylammonium hydroxide, decyldimethylbenzylammonium hydroxide, dioctadecyldimethylammonium hydroxide, beef tallow trimethylammonium hydroxide, and cocotrimethylammonium hydroxide.

Some suitable nonionic surfactants are polyoxyalkylene alkyl ethers, polyoxyalkylene alkylphenols, polyoxyalkylene alkyl esters, polyoxyalkylene sorbitan esters, polyethylene glycols, polypropylene glycols, diethylene glycol, and polyester and ethylene oxide adducts of trimethylnonanol.

Mixtures of two or more of these types of surfactants can also be used. However, nonionic surfactants are particularly preferred because of their minimal influence on the hydrosilylation reaction. The surfactant is preferably added at from 0.01 to 1,000 weight parts per 100 weight parts of the PAC-based liquid catalyst.

Another hydrosilylation catalyst according to the present invention comprises a surfactant and the PAC-based liquid catalyst. The surfactant and the liquid catalyst in this hydrosilylation catalyst embodiment are the same as described above.

The hydrosilylation catalyst which comprises only a surfactant and the PAC-based liquid catalyst has the capacity to form the emulsion-type hydrosilylation catalyst upon its addition to water. The catalyst can be used to prepare the emulsion-type hydrosilylation catalyst either by adding it to water, or by adding it to water in which a compound containing an aliphatically unsaturated carbon-carbon bond and an SiH-functional compound have already been dispersed.

Hydrosilylation of aliphatically unsaturated carbon-carbon bonds by silicon-bonded hydrogen in water is carried out by using one of the forms of hydrosilylation catalyst described above.

The type of aliphatically unsaturated carbon-carbon bond is not critical and is exemplified by alkenyl groups such as vinyl, allyl, butenyl, and pentenyl; alkynyl groups such as ethynyl; and enylene groups such as vinylene and propenylene.

Compounds containing aliphatically unsaturated carbon-carbon bonds can be olefins such as ethylene, propylene, 1-butene, isobutene, 1-pentene, and 1-hexene; dienes such as butadiene and pentadiene; aromatic compounds such as styrene and α-methylstyrene; cyclic compounds such as cyclohexene and cyclobutene; ethers such as methyl vinyl ether, divinyl ether, and phenyl vinyl ether; carboxylic acids and esters such as acrylic acid, methacrylic acid, and methyl methacrylate; halides such as allyl chloride, methacryloyl chloride, and allyl bromide; organopolysiloxanes functionalized with alkenyl groups such as vinyl, allyl, butenyl, pentenyl, and hexenyl; polyethers functionalized with alkenyl groups such as vinyl, allyl, butenyl, pentenyl, and hexenyl; polyesters functionalized with alkenyl groups such as vinyl, allyl, butenyl, pentenyl, and hexenyl; epoxy resins functionalized with alkenyl groups such as vinyl, allyl, butenyl, pentenyl, and hexenyl; and polyisobutylenes functionalized with alkenyl groups such as vinyl, allyl, butenyl, pentenyl, and hexenyl.

The type of SiH-containing compound is not critical as long as it contains silicon-bonded hydrogen. Suitable SiH-containing compounds include silanes such as dimethylchlorosilane and methyldichlorosilane; SiH-functional organopolysiloxanes having a cyclic, straight chain, branched chain, or dendritic structure; and silicon-containing organics such as dimethylhydrogensilyl-functional polyolefins, dimethylhydrogensilyl-functional epoxy resins, and dimethylhydrogensilyl-functional polyisobutylenes.

Hydrosilylation begins with the dispersion in water of an aliphatically unsaturated compound and SiH-functional compound as a preparatory step. This dispersion may be prepared by first dispersing each component separately in water and then mixing these dispersions. In the preferred method, it is prepared by mixing the components in advance and then dispersing the mixture in water. The use of a surfactant is preferred to achieve a stable dispersion of the components in water.

Any surfactant may be used as long as it does not inhibit hydrosilylation. Most preferred of the surfactants are nonionic surfactants such as polyoxyethylene alkyl ethers and polyoxyethylene alkylphenyl ethers; anionic surfactants such as sodium alkyl sulfates and sodium polyoxyethylene alkyl ether sulfates; or mixtures of two or more of such surfactants.

The amount of surfactant used is not critical, but it is preferably within the range of 0.1 to 20 weight parts for each 100 weight parts of the total weight of the above-mentioned components. The amount of water is also not critical, but it is preferably within the range of 10 to 200 weight parts for each 100 weight parts of the total weight of the above-mentioned components.

The components can be dispersed in water using stirrers or mixers such as colloid mills or homogenizers. Hydrosilylation is preferably carried out with the addition of 0.5 to 5 moles of silicon-bonded hydrogen atom per 1 mole of aliphatically unsaturated carbon-carbon bond.

The reaction is carried out by adding the catalyst to the aqueous dispersion of the aliphatically unsaturated compound and the SiH-functional compound. The amount of catalyst is not critical but should be in a range from 0.1 to 1,000 weight-ppm, preferably from 0.1 to 500 weight-ppm, and more preferably from 1 to 50 weight-ppm, in each case as platinum metal in the catalyst, referred to the total amount of the aliphatically unsaturated compound and the SiH-functional compound. The hydrosilylation reaction temperature is preferably from 0 to 100° C., and more preferably from 5 to 70° C.

EXAMPLES

The hydrosilylation catalyst and method of this invention will be explained in greater detail below through working examples. In the examples, viscosity values were measured at 25° C. The volumetric average particle size and the content (volume percent) of the catalyst with a particle size less than or equal to 1 $\mu$m, in the volumetric particle size distribution of the PAC-based liquid catalyst dispersed in water, were determined by measurement with a laser-scattering submicron particle size analyzer, Coulter N4 model from Coulter Electronics. The development of the hydrosilylation reaction was evaluated by deactivating the catalyst by adding triethylamine to the reaction system, eliminating water, measuring the reaction mixture by $^1$H-nuclear magnetic resonance analysis (NMR), and determining the amount of residual silicon-bonded hydrogen (i.e., residual SiH in mole percent), by comparing the amount of silicon-bonded hydrogen before and after the reaction.

Example 1

1 g of a liquid catalyst comprising a 1,3-divinyl-1,1,3,3-tetramethyldisiloxane and isopropyl alcohol solution of a platinum-1,3-divinyl-1,1,3,3-tetramethyldisiloxane complex, was homogeneously dispersed in an aqueous solution comprising 97 g ion-exchanged water and 8 g polyoxyethylene nonylphenyl ether (9.5-mole EO adduct), to give an emulsion of the liquid catalyst. This emulsion was designated hydrosilylation catalyst (A). The volumetric average particle size of the liquid catalyst in catalyst (A) was 0.25 μm, and the content of catalyst with a particle size less than or equal to 1 μm was 95 weight percent.

Example 2

1 g of a liquid catalyst comprising a 1,3-divinyl-1,1,3,3-tetramethyldisiloxane solution of a platinum-1,3-divinyl-1,1,3,3-tetramethyldisiloxane complex, was homogeneously dispersed in an aqueous solution comprising 97 g ion-exchanged water and 8 g polyoxyethylene nonylphenyl ether (9.5-mole EO adduct), to give an emulsion of the liquid catalyst. This emulsion was designated hydrosilylation catalyst (B). The volumetric average particle size of the liquid catalyst in catalyst (B) was 0.25 μm, and the content of catalyst with a particle size less than or equal to 1 μm was 79 weight percent.

Example 3

1 g of a liquid catalyst comprising a solution of a platinum-1,3-divinyl-1,1,3,3-tetramethyldisiloxane complex in 1,3-divinyl-1,1,3,3-tetramethyldisiloxane and a dimethylvinylsiloxy-endblocked dimethylsiloxane oligomer, was homogeneously dispersed in an aqueous solution comprising 97 g ion-exchanged water and 8 g polyoxyethylene nonylphenyl ether (9.5-mole EO adduct), to give an emulsion of the liquid catalyst. This emulsion was designated hydrosilylation catalyst (C). The volumetric average particle size of the liquid catalyst in catalyst (C) was 0.8 μm, and the content of catalyst with a particle size less than or equal to 1 μm was 44 weight percent.

Comparative Example 1

1 g of a liquid catalyst comprising a solution of a platinum-1,3-divinyl-1,1,3,3-tetramethyldisiloxane complex in 1,3-divinyl-1,1,3,3-tetramethyldisiloxane and a dimethylvinylsiloxy-endblocked dimethylsiloxane oligomer, was homogeneously dispersed in an aqueous solution comprising 97 g ion-exchanged water and 8 g polyoxyethylene nonylphenyl ether (9.5-mole EO adduct), to give an emulsion of the liquid catalyst. This emulsion was designated hydrosilylation catalyst (D). The volumetric average particle size of the liquid catalyst in catalyst (D) was 1.3 μm, and the content of catalyst with a particle size less than or equal to 1 μm was 17 weight percent.

Comparative Example 2

A 5 weight percent isopropyl alcohol solution of chloroplatinic acid was designated hydrosilylation catalyst (E).

Example 4

3 g liquid catalyst comprising a solution of a platinum-1,3-divinyl-1,1,3,3-tetramethyldisiloxane complex in 1,3-divinyl-1,1,3,3-tetramethyldisiloxane and isopropyl alcohol solution, was homogeneously dispersed in 6 g polyoxyethylene nonylphenyl ether (9.5-mole EO adduct), to provide a surfactant dispersion of the liquid catalyst. This dispersion of liquid catalyst in a surfactant was designated hydrosilylation catalyst (F). An emulsion of the liquid catalyst was prepared by the addition of catalyst (F) to water. The characteristics of this emulsion were such that the volumetric average particle size of the liquid catalyst was 0.46 μm, and the content of catalyst with a particle size less than or equal to 1 μm was 66 weight percent.

Reference Example 100 weight parts of a dimethylhydrogensiloxy-endblocked dimethylpolysiloxane with a viscosity of 10 centistoke ($mm^2/s$), was mixed with 1-hexene, two-fold on a molar basis, with respect to the silicon-bonded hydrogen in the dimethylpolysiloxane. Into the resulting mixture was then admixed an aqueous solution of 6 weight parts nonylphenyl polyethylene oxide (9.5-mole EO adduct), and 70 weight parts ion-exchanged water. Mixing with an homogenizer provided an emulsion of a composition capable of undergoing an hydrosilylation reaction. 230 g ion-exchanged water was added to this emulsion with mixing to homogeneity, by stirring for 30 minutes using a blade stirrer. The product was employed as an emulsion of a hydrosilylation-capable composition in the following examples and comparative examples.

Examples 5 to 8 and Comparative Examples 3 and 4

Catalyst, in an amount providing 16 ppm platinum metal referred to as the total weight of the polydimethylsiloxane and a-hexene, was added at room temperature, to the emulsion of hydrosilylation-capable composition, whose preparation is described immediately above in the Reference Example. The resulting mixture was stirred for 5 minutes with a blade stirrer and then allowed to stand. The rate of the hydrosilylation reaction was evaluated, and the results are reported in Table 1. The temperature rise in the emulsion, i.e., the maximum achieved temperature, based on the heat released by the hydrosilylation reaction, is also reported in Table 1.

TABLE 1

|  | Ex. 5 | Ex. 6 | Ex. 7 | Ex. 8 | Comp. Ex. 3 | Comp. Ex. 4 |
| --- | --- | --- | --- | --- | --- | --- |
| Catalyst used | A | B | C | F | D | E |
| Residual SiH (mole %) | | | | | | |
| 1 hour after start of reaction | 80 | 75 | 75 | 65 | 87 | 95 |
| 2 hours after start of reaction | 25 | 25 | 20 | 15 | 84 | 95 |
| Highest temperature (° C.) achieved by the reaction bath | 31 | 33 | 36 | 35 | 27 | 26 |

Comparative Example 5

100 weight parts of a dimethylhydrogensiloxy-endblocked dimethylpolysiloxane with a viscosity of 10 centistoke used in Example 5, was mixed with a-hexene, two-fold on a molar basis, with respect to the silicon-bonded hydrogen in the dimethylpolysiloxane. A solution containing 5 weight percent of a platinum-1,3-divinyl-1,1,3,3-tetramethyldisiloxane complex in 1,3-divinyl-1,1,3,3-tetramethyldisiloxane and isopropyl alcohol, was then added, and the mixture was stirred with a blade stirrer. The catalyst provided 16 ppm platinum metal, based on the total amount of the polydimethylsiloxane and hexene. The hydrosilylation reaction began immediately after stirring by the blade stirrer. After 1 minute, the temperature had reached at least 100° C., and measurement of the absorption peak for silicon-bonded hydrogen by $^1$H-NMR showed that approximately 50 percent of the silicon-bonded hydrogen remained.

The hydrosilylation catalyst of this invention has the capacity to induce a rapid hydrosilylation in water of aliphatically unsaturated carbon-carbon bonds by silicon-bonded hydrogen. By using this catalyst, the method of this invention carries out a rapid hydrosilylation in water Other variations may be made in compositions and methods described herein without departing from the essential features of the invention. The embodiments of the invention specifically illustrated herein are exemplary only and not intended as limitations on their scope except as defined in the appended claims.

What is claimed is:

1. An hydrosilylation catalyst emulsion comprising a dispersion in water of a surfactant and a liquid platinum and alkenylsiloxane complex selected from the group consisting of platinum-1,3-divinyl-1,1,3,3-tetramethyldisiloxane complex, platinum-1,3-diallyl-1,1,3,3-tetramethyldisiloxane complex, platinum-1,3-divinyl-1,3-dimethyl-1,3-diphenyldisiloxane complex, platinum-1,3-divinyl-1,1,3,3-tetraphenyldisiloxane complex, and platinum-1,3,5,7-tetramethyl-1,3,5,7-tetravinylcyclotetrasiloxane complex, in which the volumetric average particle size diameter of liquid dispersed in liquid particle form in water is one micrometer or less than one micrometer.

2. An hydrosilylation catalyst according to claim 1 in which the catalyst with a particle size of one micrometer or less than one micrometer comprises at least 40 weight percent of the volumetric particle size distribution of liquid dispersed.

3. An hydrosilylation catalyst according to claim 2 in which the catalyst is a 1,3-divinyl-1,1,3,3-tetramethyldisiloxane solution of platinum-1,3-divinyl-1,1,3,3-tetramethyldisiloxane complex; a 1,3-divinyl-1,1,3,3-tetramethyldisiloxane and isopropyl alcohol solution of platinum-1,3-divinyl-1,1,3,3-tetramethyldisiloxane complex; or a solution of platinum-1,3-divinyl-1,1,3,3-tetramethyldisiloxane complex in 1,3-divinyl-1,1,3,3-tetramethyldisiloxane and a dimethylvinylsiloxy-endblocked dimethylsiloxane oligomer.

4. An hydrosilylation catalyst dispersion comprising a surfactant and a liquid platinum and alkenylsiloxane complex selected from the group consisting of platinum-1,3-divinyl-1,1,3,3-tetramethyldisiloxane complex, platinum-1,3-diallyl-1,1,3,3-tetramethyldisiloxane complex, platinum-1,3-divinyl-1,3-dimethyl-1,3-diphenyldisiloxane complex, platinum-1,3-divinyl-1,1,3,3-tetraphenyldisiloxane complex, and platinum-1,3,5,7-tetramethyl-1,3,5,7-tetravinylcyclotetrasiloxane complex, the catalyst being dispersed in the surfactant, and wherein the liquid dispersed in liquid particle form in the surfactant has a volumetric average particle size diameter which is one micrometer or less than one micrometer.

5. An hydrosilylation catalyst according to claim 4 in which the catalyst with a particle size of one micrometer or less than one micrometer comprises at least 40 weight percent of the volumetric particle size distribution of liquid dispersed.

6. An hydrosilylation catalyst according to claim 5 in which the catalyst is a 1,3-divinyl-1,1,3,3-tetramethyldisiloxane solution of platinum-1,3-divinyl-1,1,3,3-tetramethyldisiloxane complex; a 1,3-divinyl-1,1,3,3-tetramethyldisiloxane and isopropyl alcohol solution of platinum-1,3-divinyl-1,1,3,3-tetramethyldisiloxane complex; or a solution of platinum-1,3-divinyl-1,1,3,3-tetramethyldisiloxane complex in 1,3-divinyl-1,1,3,3-tetramethyldisiloxane and a dimethylvinylsiloxy-endblocked dimethylsiloxane oligomer.

7. A method of hydrosilylating an aliphatically unsaturated carbon-carbon bond by reaction with a silicon-bonded hydrogen atom comprising the step of conducting the reaction in water using the hydrosilylation catalyst emulsion defined in claim 1.

8. A method of hydrosilylating an aliphatically unsaturated carbon-carbon bond by reaction with a silicon-bonded hydrogen atom comprising conducting the reaction in water using the hydrosilylation catalyst dispersion defined in claim 4.

* * * * *